US008483546B2

(12) United States Patent
Borghesani et al.

(10) Patent No.: US 8,483,546 B2
(45) Date of Patent: Jul. 9, 2013

(54) APPARATUS, METHOD, AND COMPUTER PROGRAM PRODUCT FOR RECEIVING A COMMAND DURING A COMMERCIAL

(75) Inventors: Linda I. Borghesani, Acton, MA (US); David Philbin, Arlington, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1379 days.

(21) Appl. No.: 11/771,742

(22) Filed: Jun. 29, 2007

(65) Prior Publication Data

US 2009/0003796 A1      Jan. 1, 2009

(51) Int. Cl.
*H04N 9/80*      (2006.01)

(52) U.S. Cl.
USPC .......................................... 386/249; 386/248

(58) Field of Classification Search
USPC .......................................... 386/239, 248, 249
See application file for complete search history.

(56) References Cited

U.S. PATENT DOCUMENTS

| | | |
|---|---|---|
| 4,977,455 A | 12/1990 | Young |
| 5,151,789 A | 9/1992 | Young |
| 5,253,066 A | 10/1993 | Vogel |
| 5,307,173 A | 4/1994 | Yuen et al. |
| 5,335,079 A | 8/1994 | Yuen et al. |
| 5,353,121 A | 10/1994 | Young et al. |
| 5,382,983 A | 1/1995 | Kwoh et al. |
| 5,479,266 A | 12/1995 | Young et al. |
| 5,479,268 A | 12/1995 | Young et al. |
| 5,499,103 A | 3/1996 | Mankovitz |
| 5,512,963 A | 4/1996 | Mankovitz |
| 5,515,173 A | 5/1996 | Mankovitz et al. |
| 5,532,732 A | 7/1996 | Yuen et al. |
| 5,532,754 A | 7/1996 | Young et al. |
| 5,541,738 A | 7/1996 | Mankovitz |
| 5,550,576 A | 8/1996 | Klosterman |
| 5,553,123 A | 9/1996 | Chan et al. |
| 5,559,550 A | 9/1996 | Mankovitz |
| 5,600,711 A | 2/1997 | Yuen |
| 5,619,274 A | 4/1997 | Roop et al. |
| 5,640,484 A | 6/1997 | Mankovitz |
| 5,684,525 A | 11/1997 | Klosterman |
| 5,701,383 A | 12/1997 | Russo et al. |
| 5,706,145 A | 1/1998 | Hindman et al. |
| 5,727,060 A | 3/1998 | Young |
| 5,734,786 A | 3/1998 | Mankovitz |
| 5,790,198 A | 8/1998 | Roop et al. |

(Continued)

OTHER PUBLICATIONS

*TiVo and DIY Network Programming>Thumbs Up for iPreview/ TiVoMatic* (visited May 25, 2007) http://www.samspublishing.com/articles/article.asp?p=342736&seqNum=3&r1=1.

*Primary Examiner* — Thai Tran
*Assistant Examiner* — Nigar Chowdhury

(57) ABSTRACT

Apparatuses, methods, and computer program products for receiving recording or other commands are provided. In operation, a command is received during the display of a commercial for a media program, the media program and a date and time for the media program are identified, and the command is executed based on the date and time. The command may be to record the program or send a reminder to the display regarding the media program. A viewer is allowed to send the command during the commercial without requiring the user to go to a second screen, such as a recording screen, or to enter additional commands. The date and time of the media program may be identified through metadata associated with the commercial or through the review of an interactive programming guide.

19 Claims, 5 Drawing Sheets

U.S. PATENT DOCUMENTS

| | | |
|---|---|---|
| 5,801,787 A | 9/1998 | Schein et al. |
| 5,808,608 A | 9/1998 | Young et al. |
| 5,809,204 A | 9/1998 | Young et al. |
| 5,812,205 A | 9/1998 | Milnes et al. |
| 5,828,945 A | 10/1998 | Klosterman |
| 5,870,150 A | 2/1999 | Yuen |
| 5,886,746 A | 3/1999 | Yuen et al. |
| 5,915,026 A | 6/1999 | Mankovitz |
| 5,923,362 A | 7/1999 | Klosterman |
| 5,940,073 A | 8/1999 | Klosterman et al. |
| 5,949,954 A | 9/1999 | Young et al. |
| 5,959,688 A | 9/1999 | Schein et al. |
| 5,969,748 A | 10/1999 | Casement et al. |
| 5,970,206 A | 10/1999 | Yuen et al. |
| 5,974,222 A | 10/1999 | Yuen et al. |
| 5,987,213 A | 11/1999 | Mankovitz et al. |
| 5,988,078 A | 11/1999 | Levine |
| 5,991,498 A | 11/1999 | Young |
| 6,002,394 A | 12/1999 | Schein et al. |
| 6,016,141 A | 1/2000 | Knudson et al. |
| 6,028,599 A | 2/2000 | Yuen et al. |
| 6,049,652 A | 4/2000 | Yuen et al. |
| 6,052,145 A | 4/2000 | Macrae et al. |
| 6,072,983 A | 6/2000 | Klosterman |
| 6,075,551 A | 6/2000 | Berezowski et al. |
| 6,075,575 A | 6/2000 | Schein et al. |
| 6,078,348 A | 6/2000 | Klosterman et al. |
| 6,091,882 A | 7/2000 | Yuen et al. |
| 6,118,492 A | 9/2000 | Milnes et al. |
| 6,133,909 A | 10/2000 | Schein et al. |
| 6,137,950 A | 10/2000 | Yuen |
| 6,144,401 A | 11/2000 | Casement et al. |
| 6,151,059 A | 11/2000 | Schein et al. |
| 6,167,188 A | 12/2000 | Young et al. |
| 6,177,931 B1 | 1/2001 | Alexander et al. |
| 6,216,265 B1 | 4/2001 | Roop et al. |
| 6,239,794 B1 | 5/2001 | Yuen et al. |
| 6,247,176 B1 | 6/2001 | Schein et al. |
| 6,262,722 B1 | 7/2001 | Allison et al. |
| 6,263,501 B1 | 7/2001 | Schein et al. |
| 6,323,911 B1 | 11/2001 | Schein et al. |
| 6,341,195 B1 | 1/2002 | Mankovitz et al. |
| 6,341,374 B2 | 1/2002 | Schein et al. |
| 6,388,714 B1 | 5/2002 | Schein et al. |
| 6,396,546 B1 | 5/2002 | Alten et al. |
| 6,412,110 B1 | 6/2002 | Schein et al. |
| 6,430,358 B1 | 8/2002 | Yuen et al. |
| 6,430,359 B1 | 8/2002 | Yuen et al. |
| 6,453,471 B1 | 9/2002 | Klosterman |
| 6,460,181 B1 | 10/2002 | Donnelly |
| 6,466,734 B2 | 10/2002 | Yuen et al. |
| 6,469,753 B1 | 10/2002 | Klosterman et al. |
| 6,477,705 B1 | 11/2002 | Yuen et al. |
| 6,498,895 B2 | 12/2002 | Young et al. |
| 6,505,348 B1 | 1/2003 | Knowles et al. |
| 6,538,701 B1 | 3/2003 | Yuen |
| 6,549,719 B2 | 4/2003 | Mankovitz |
| 6,564,379 B1 | 5/2003 | Knudson et al. |
| 6,567,606 B2 | 5/2003 | Milnes et al. |
| 6,588,013 B1 | 7/2003 | Lumley et al. |
| 6,668,133 B2 | 12/2003 | Yuen et al. |
| 6,687,906 B1 | 2/2004 | Yuen et al. |
| 6,732,369 B1 | 5/2004 | Schein et al. |
| 6,742,183 B1 | 5/2004 | Reynolds et al. |
| 6,745,391 B1 | 6/2004 | Macrae et al. |
| 6,756,997 B1 | 6/2004 | Ward et al. |
| 6,760,537 B2 | 7/2004 | Mankovitz |
| 6,799,326 B2 | 9/2004 | Boylan et al. |
| 6,799,327 B1 | 9/2004 | Reynolds et al. |
| 6,850,693 B2 | 2/2005 | Young et al. |
| 6,859,799 B1 | 2/2005 | Yuen |
| 7,039,935 B2 | 5/2006 | Knudson et al. |
| 7,069,576 B1 | 6/2006 | Knudson et al. |
| 7,487,529 B1 | 2/2009 | Orlick |
| 2001/0029610 A1 | 10/2001 | Corvin et al. |
| 2001/0047298 A1 | 11/2001 | Moore et al. |
| 2001/0054181 A1 | 12/2001 | Corvin |
| 2002/0042914 A1 * | 4/2002 | Walker et al. ................... 725/36 |
| 2002/0073424 A1 | 6/2002 | Ward et al. |
| 2002/0124255 A1 | 9/2002 | Reichardt et al. |
| 2003/0005445 A1 | 1/2003 | Schein et al. |
| 2003/0056219 A1 | 3/2003 | Reichardt et al. |
| 2003/0110495 A1 | 6/2003 | Bennington et al. |
| 2003/0110499 A1 | 6/2003 | Knudson et al. |
| 2003/0115599 A1 | 6/2003 | Bennington et al. |
| 2003/0115602 A1 | 6/2003 | Knee et al. |
| 2003/0163813 A1 | 8/2003 | Klosterman et al. |
| 2003/0164858 A1 | 9/2003 | Klosterman et al. |
| 2003/0188310 A1 | 10/2003 | Klosterman et al. |
| 2003/0188311 A1 | 10/2003 | Yuen et al. |
| 2003/0196201 A1 | 10/2003 | Schein et al. |
| 2003/0204847 A1 | 10/2003 | Ellis et al. |
| 2003/0208756 A1 | 11/2003 | Macrae et al. |
| 2004/0010806 A1 | 1/2004 | Yuen et al. |
| 2004/0045025 A1 | 3/2004 | Ward et al. |
| 2004/0107437 A1 | 6/2004 | Reichardt et al. |
| 2004/0168189 A1 | 8/2004 | Reynolds et al. |
| 2004/0194138 A1 | 9/2004 | Boylan et al. |
| 2004/0261098 A1 | 12/2004 | Macrae et al. |
| 2005/0010949 A1 | 1/2005 | Ward et al. |
| 2005/0028201 A1 | 2/2005 | Klosterman et al. |
| 2005/0097599 A1 * | 5/2005 | Plotnick et al. ................. 725/32 |
| 2005/0125823 A1 | 6/2005 | McCoy et al. |
| 2005/0149964 A1 | 7/2005 | Thomas et al. |
| 2005/0155056 A1 | 7/2005 | Knee et al. |
| 2005/0216936 A1 | 9/2005 | Knudson et al. |
| 2005/0251824 A1 | 11/2005 | Thomas et al. |
| 2006/0156336 A1 | 7/2006 | Knudson et al. |
| 2006/0212894 A1 | 9/2006 | Knudson et al. |
| 2006/0277574 A1 | 12/2006 | Schein et al. |
| 2006/0288366 A1 | 12/2006 | Boylan et al. |
| 2007/0016926 A1 | 1/2007 | Ward et al. |
| 2007/0033613 A1 | 2/2007 | Ward et al. |
| 2007/0107010 A1 * | 5/2007 | Jolna et al. ...................... 725/34 |

* cited by examiner

APPARATUS, METHOD, AND COMPUTER PROGRAM PRODUCT FOR RECEIVING A COMMAND DURING A COMMERCIAL

BACKGROUND

The usage of time-shift programming and on-demand programming has become popular with many viewers. In general such features allow the viewers to watch media programs at times more convenient to them rather than requiring the viewers to watch the media programs during the scheduled broadcast of the media programs by the media providers.

Video tape recorders ("VTRs"), such as the one disclosed in U.S. Pat. No. 2,956,114, were first introduced in the 1950's. Although VTRs revolutionized television broadcasting at the broadcasting studios, VTRs were generally too extensive for home usage. The Sony Corporation introduced a video cassette recorder ("VCR") in the early 1970's. Although the VCR was intended for home usage, the VCR did not become popular until the early 1980's. Since then, the VCR was quickly adopted by many viewers. In 1997, the VCR was named the number one invention which has "made life earlier" for Americans in daily life according to the Invention Index. Despite the popularity of the VCR, many viewers considered VCRs difficult to operate properly. During the 1990's, the digital video recorder (DVR) was introduced. Compared to the VCR, many viewers consider the DVR easier to operate especially in view of interactive programming guides ("IPGs") that allow viewers to scan channel and media program listings and select one or more media programs through the IPGs for recording. Moreover, the DVR provided more recording options for viewers compared to a VCR. For example, the DVR allows for the recording of an entire season of a particular media program.

Although the DVR and the IPG have provided the viewer with an easier and quicker means for recording a media program or programs compared to the VCR, the viewer is still required to navigate through the IPG to find a media program of interest. With an ever increasing number of channels, browsing through the IPG is becoming more time consuming. With the number of channels and media programs available, a viewer may miss a media program that he or she would have found interesting if he or she was aware of the media program or a viewer may be aware of a particular media program but might have problems locating it through the IPG.

BRIEF DESCRIPTION OF THE SEVERAL VIEWS OF THE DRAWING(S)

DETAILED DESCRIPTION OF PREFERRED EMBODIMENTS

Exemplary embodiments are described hereinafter with reference to the accompanying drawings, in which exemplary embodiments and examples are shown. Like numbers refer to like elements throughout.

Figure 1:
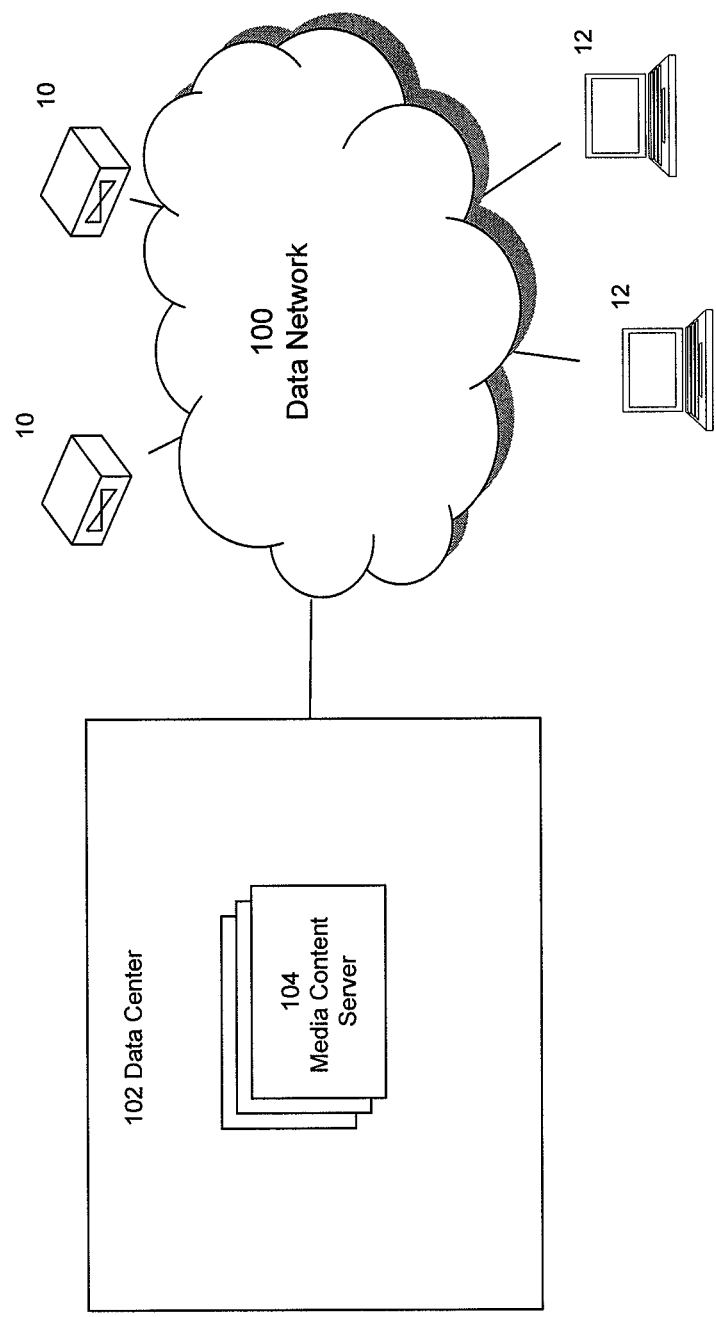
FIG. 1 is a block diagram of a data network consistent with an exemplary embodiment.

Embodiments relate to apparatuses, methods, and computer program products for recording one or more media programs in response to a command from a user. FIG. 1 illustrates a data network consistent with an exemplary embodiment. The data network may include a Wide Area Network ("WAN"), a Local Area Network ("LAN"), an intranet and/or the Internet. As a more specific example, at least part of the data network may be part of a fiber optic network, such as fiber-to-the-home ("FTTH"), fiber-to-the-premises ("FTTP"), fiber-to-the-curb ("FTTC"), fiber-to-the-X ("FTTX") and other fiber optic networks of one or more media and telephone service providers configured to deliver services to a number of users or subscribers. In an alternative embodiment, at least part of the data network may include a wireless network or a direct satellite broadcast network.

As illustrated, one or more computing devices and/or peripheral devices may be within or connected to the data network 100. The computing devices may include servers, desktops and laptops 12 and have various communication programming applications including, for example, email and an Internet browser. Another communication device may be a set top box 10. The set top box 10 may be configured to receive one or more signals representing a media program from an external source and convert the signals for display of the media program on a television that is communication with the set top box. As an example, the external source may be a data center 102. The data center 102 may include one or more media content servers 104 (collectively, the media content servers may be referred to as a content server farm). The media content servers 104 collectively provide at least some of the storage and processing functions for a media provider for delivering the media programs to the set top boxes and/or other computing devices of the data network. Although the data center 102, the set top boxes 10, and the computing devices 12 are shown with direct connections to the data network 100 any number and type of network elements may be interposed between the data center 102, the set top boxes 10, and the computing devices 12.

Figure 2:
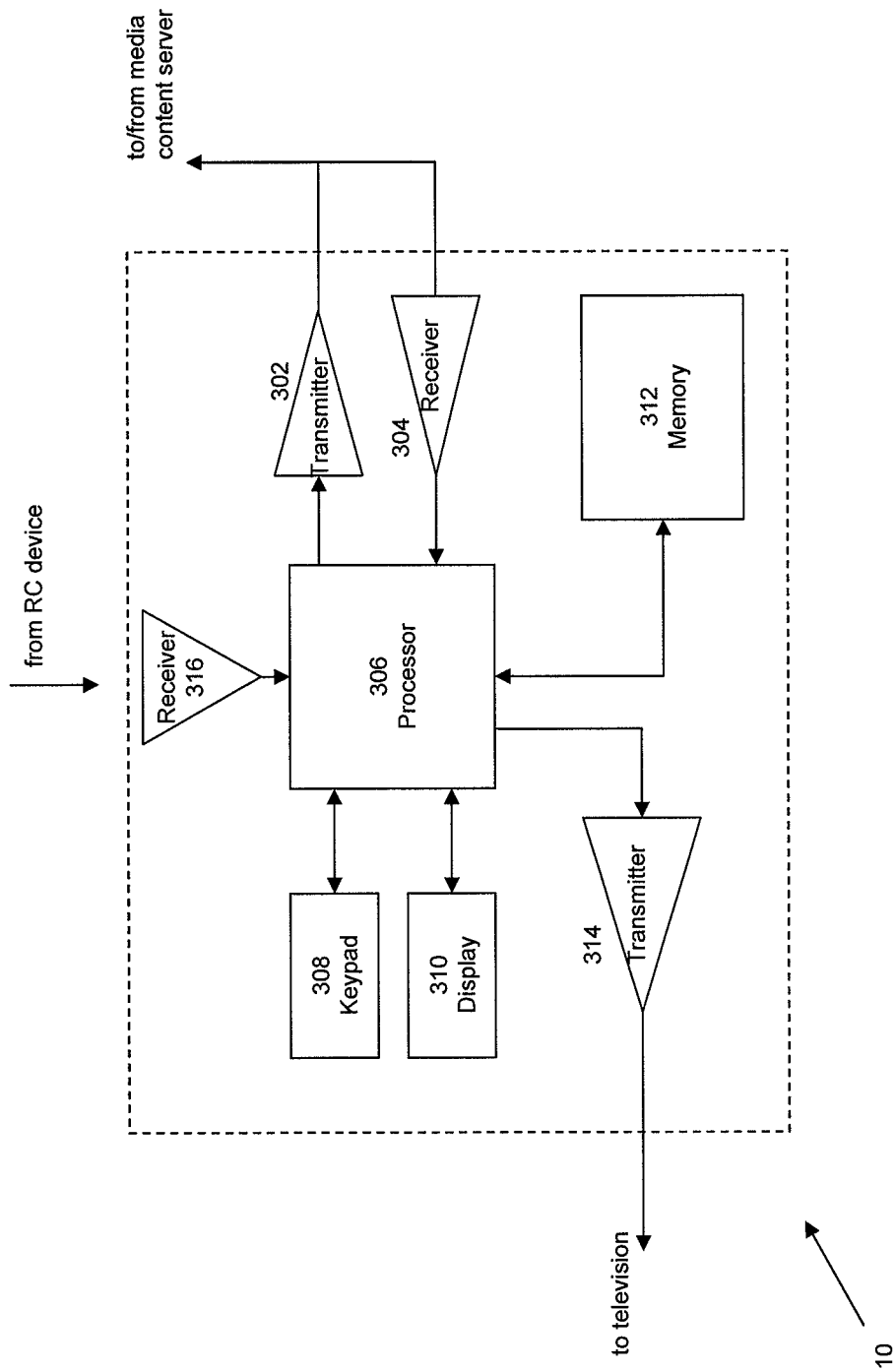
FIG. 2 is a block diagram of a set top box consistent with an exemplary embodiment.

As shown in FIG. 2, the set top box 12 may include a first transmitter 302, a first receiver 304, a processor 306, a user interface such as a keypad 308, a display 310, at least a first memory element 312, a second transmitter 314, and a second receiver 316.

The first receiver 304 is configured to receive the media program from the external source through the data network 100. For examples, the set top box may include an adapter or port for receiving a fiber optic cable or a coaxial cable of the data network or a wireless receiver, such as an antenna. And the external source may be one or more media content servers or other computing devices of a media provider that is communicatively coupled to the set top box through the data network.

The processor 306 may be configured to provide processing and command functions, which may include translation or conversion of the received signals into an output suitable for display on the television. The processor 306 may also be configured to send the media program through the second transmitter 314 of the set top box 12 to the television. Although not illustrated, the media set top box may have a third transmitter and the processor 306 may be configured to process the received signals into two outputs, i.e., a video output sent through the second transmitter for display on the television and a sound output sent through the third transmitter to a sound system either integrated with the television or a stand alone system.

The display of the set top box may include information such a clock and/or the current channel for the television, and/or indicators on whether or not the set top box is powered on and/or whether it is recording. In instances in which the user interface includes a keypad, the keypad 308 may include one or more buttons to allow a user to enter commands and selections into the set top box 12. The second receiver 316 may be configured to receive radio signals from a remote control device (not illustrated) as another method of receiving commands and selections from a user.

The processor 306 may also be configured to send a request through the first transmitter 302 to the media provider for a particular media program or programs based on commands and selections from the user. The request may include a live media program or a video on demand ("VOD") asset. The processor 306 may also record the signals for the requested media program into the memory element 312 based on commands and selections from the user (e.g., the set top box may include a digital video recorder ("DVR")). For example, the user may request for a future program to be recorded. At the scheduled time for the media program, the processor 306 may request the corresponding signals for the media program, also referred to herein as media programming signals, and store the media programming signals into the memory element. The stored or recorded media program is viewable to the user upon request. In particular, the processor 306 may retrieve a recorded program from the memory element 312 and send it to the television to be viewed by the user upon request from the user. The memory element 312 may also maintain programming instructions, i.e., software, pertaining to the functions and operability of the set top box.

The set top box 12 may also be configured to receive signals from the media provider that represent an interactive programming guide ("IPG") for the user. In particular, upon request from the user, the processor 306 sends a request to the media provider for the signals that provide the IPG. In response to the request, the media provider sends the IPG to the set top box. The set top box 12 may also store at least some of the signals that represent the IPG. For example, according to an alternate embodiment, the set top box 12 may periodically (e.g., every day, every time the set top box is powered on) receive and store signals for the IPG from the media provider without receiving a particular request from the user. With the stored IPG, the set top box may send the stored IPG to the television for the user without receiving additional signals from the media provider at the time of the request from the user. The stored IPG may contain information for the available channels for a predetermined amount of days or hours (e.g., 14 days). The IPG may be customer specific, e.g., the media provider may send an IPG that corresponds to an account of the user, which may take into consideration the channels available to the user based on the location of the set top box and the subscription of the user, e.g., a basic channel package or a channel package with premium channels.

The processor 306 may send the IPG to the television for display thereon and interaction with the user. The IPG may display a listing of channels, times, and programming and the user may browse through the listing through either the keypad 308 or remote control device. In general, the IPG provides a graphic user interface ("GUI") for the user and, through this GUI, the user may be able to select programs to watch or to be recorded, call up recorded programs, and/or order videos on demand. The processor 306 may either execute the selections or store them within the memory element 312 for future execution. In regards to recording options, the user may be able to select a media program through the IPG to be recorded. The user may also select a media program and then select for that media program and all related media programs to be recorded. For example, the user may select a first media program, such as an episode of a television show, such as Desperate Housewives, and then select that episode and all other episodes of Desperate Housewives to be recorded. Other options may include only recording new episodes of a television show, only recording episodes that are on a particular channel, only recording a maximum number of episodes, or only recording an episode if the memory element 312 of the set top box has the capacity to record without removing an earlier recorded media program.

The media programming signals may include metadata. For example, the media programming signals for the IPG may include metadata for one or more of the channels and/or the media programs for the channels. In response to receiving a recording command from the user, the processor 306 may process the metadata to determine which media programs correspond to the recording command. In the example for recording all episodes of Desperate Housewives, the processor 306 may process the metadata associated with the IPG to determine what media programs are episodes of Desperate Housewives and then record accordingly. As another example, the metadata may indicate whether an episode is new or a rerun and thus the processor 306 may be able to determine the new episodes for Desperate Housewives and record accordingly if the recording command is only for new episodes.

The media programming signals for a first media program may also include one or more commercials. A commercial may be an advertisement or preview regarding a second media program. In this situation, the media programming signals may include metadata associated with the commercial and thus the second media program. During the viewing or display of the commercial or within a predetermined period following the display of the commercial, the user may enter at least one command regarding the second media program, which is the subject of the commercial. The command received by the set top box from the user may be from a remote device, keypad, or other input of the set top box. A command may be for recording the second media program or providing a reminder to the user closer to the airing of the second media program of the upcoming showing.

The processor may be configured to receive the command from the user during the commercial and then process the metadata to execute the command. For example, the command may be to record the second media program and the processor may determine the date, channel, and time of the second media program from the metadata and record accordingly without requiring the user to use an additional recording screen or to provide additional inputs. In another example, the time, date, and channel may not be known for the second media program at the time of the display of the commercial, the processor may receive the command and determine the name or other characteristic of the second media program from the metadata and store the command. The processor may be further configured to review future media programming signals that represent the IPG and search for and record the second media program according to the command. For example, a media provider may provide a commercial for a new television program that the provider intends on offering next season. If the user wants the new television program to be recorded, the user can indicate his or her recording preference and the set top box may monitor the media programming signals for the IPG for the new television program.

In instances in which the metadata associated with the commercial contains the date and time, the processor may be configured to verify the accuracy of the metadata. For example, the processor may be configured to determine the date and time of the second media program from the metadata associated with the commercial and then review future media programming signals that represent the IPG and search for the second media program by name or other characteristic of the second media program obtainable from the metadata. Once the processor locates the second media program through the review of the IPG, the processor may confirm the scheduled date and time of the IPG with the date and time of the metadata associated with the commercial. If the two are substantially the same then the processor may be configured to schedule the recording for that date and time. If a discrepancy exists between the two, the processor may be configured to send a message to the user to allow the user to determine the correct date and time. In addition to or instead of verifying the date and time, the processor may also be configured to verify the channel for the second media program.

In some instances, a recording command may create a conflict. For example, the set top box may have a limited capability in the number of media programs it can record simultaneously or store. If the recording command creates a conflict, the processor may be configured to send a message to the user to allow the user to resolve the conflict.

The commercial may include an on-screen visible marking to indicate to the user that he or she may enter a command to record or set up a reminder for the media program that is subject to the commercial. The visible marking may be embedded into the commercial through the media programming signals that are received by the set top box from the media provider. Or the processor may be configured to embed the visible marking into the commercial. For example, the processor may be configured to identify a commercial within the first media program and determine whether the media programming signals include the associated metadata that allows the processor to identify the second media program that is the subject of the commercial. If the associated metadata is present then the processor may generate and embed the visible marking to indicate to the viewer that he or she can enter commands regarding the second media program.

Figure 3:
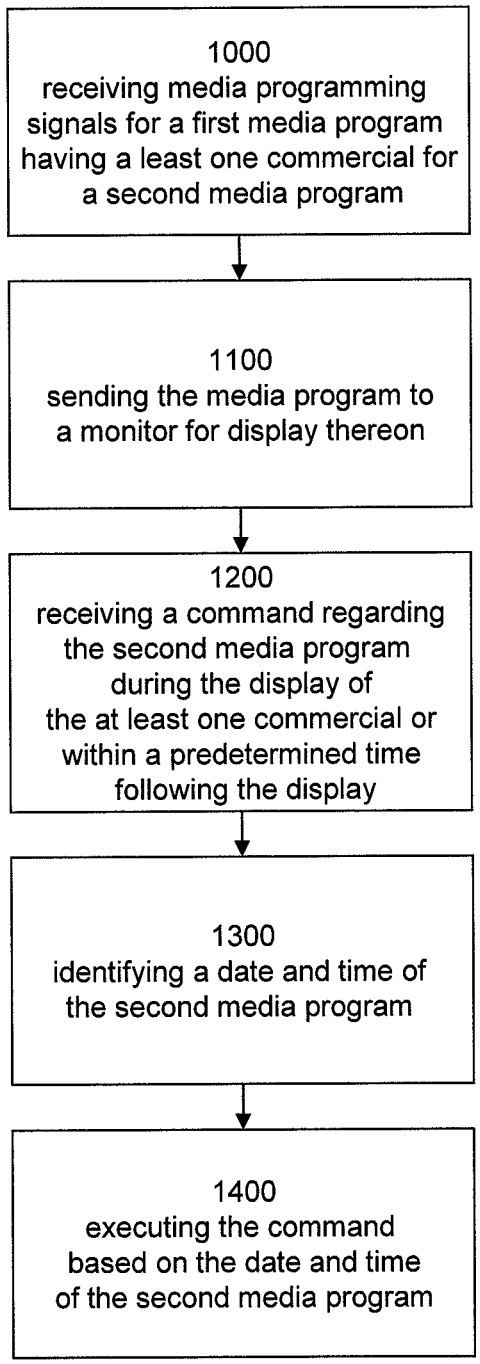
FIG. 3 is a flow chart illustration of a method according to an exemplary embodiment.

FIG. 3 illustrates a method consistent with an exemplary embodiment. The method may include receiving one or more media programming signals for a first media program having at least one commercial for a second media program, wherein the one or more media programming signals includes one or more metadata associated with the at least one commercial 1000 and sending the one or more media programming signals for the first media program to an associated monitor for display thereon 1100. The method may further include receiving a command regarding the second media program during the display of the at least one commercial or within a predetermined period following the display of the commercial 1200; identifying a date and time of the second media program 1300; and executing the command based on the date and time of the second media program 1400.

The operation of identifying a date and time of the second media program may include processing the one or more metadata associated with the at least one commercial and it may further include searching one or more media programming signals for an IPG to locate the second media program.

The execution of the command may include recording the second media program or sending a reminder regarding the second media program. The recording command may be accepted from the user during the display of the commercial without requiring the user to go to an additional screen such as a recording screen or the IPG or requiring additional commands from the user. The timing of the execution of the command may be based on the date and time of the second media program. If the command is for recording the second media program, then the execution may occur at or near the date and time of the second media program when the media programming signals for the second media program are broadcasted. If the command is for sending a reminder regarding the second media program, then the execution may occur at a predetermined time before the date and time of the second media program and/or at or near the date and time of the second media program.

The method of FIG. 3 may further include receiving a command for the first media program from a user and requesting and receiving the one or more media programming signals for the first media program from a media provider. The sending of the one or more media programming signals for the first media program to an associated monitor may be live or from a recording. In other words, the user may request the first media program as it is being broadcasted by the media provider or the user may have had the first media program recorded and then have the recording be sent to the associated monitor for display.

Regarding the temporal aspect of receiving the command, according to this embodiment, the command is received either during or within a predetermined time following the display of the commercial, which may be collectively referred to as being in a "temporal proximity" with the display of the commercial. The predetermined time afterwards may include a specified number of minutes after the end of the commercial. For example, it may be 1, 2, 3, 4, etc. . . . minutes after the end of the commercial. Or the predetermined time may be determined by the start of another commercial or the return of the television show either through another command by the user or by a schedule established by the media provider or a particular channel.

Figure 4:
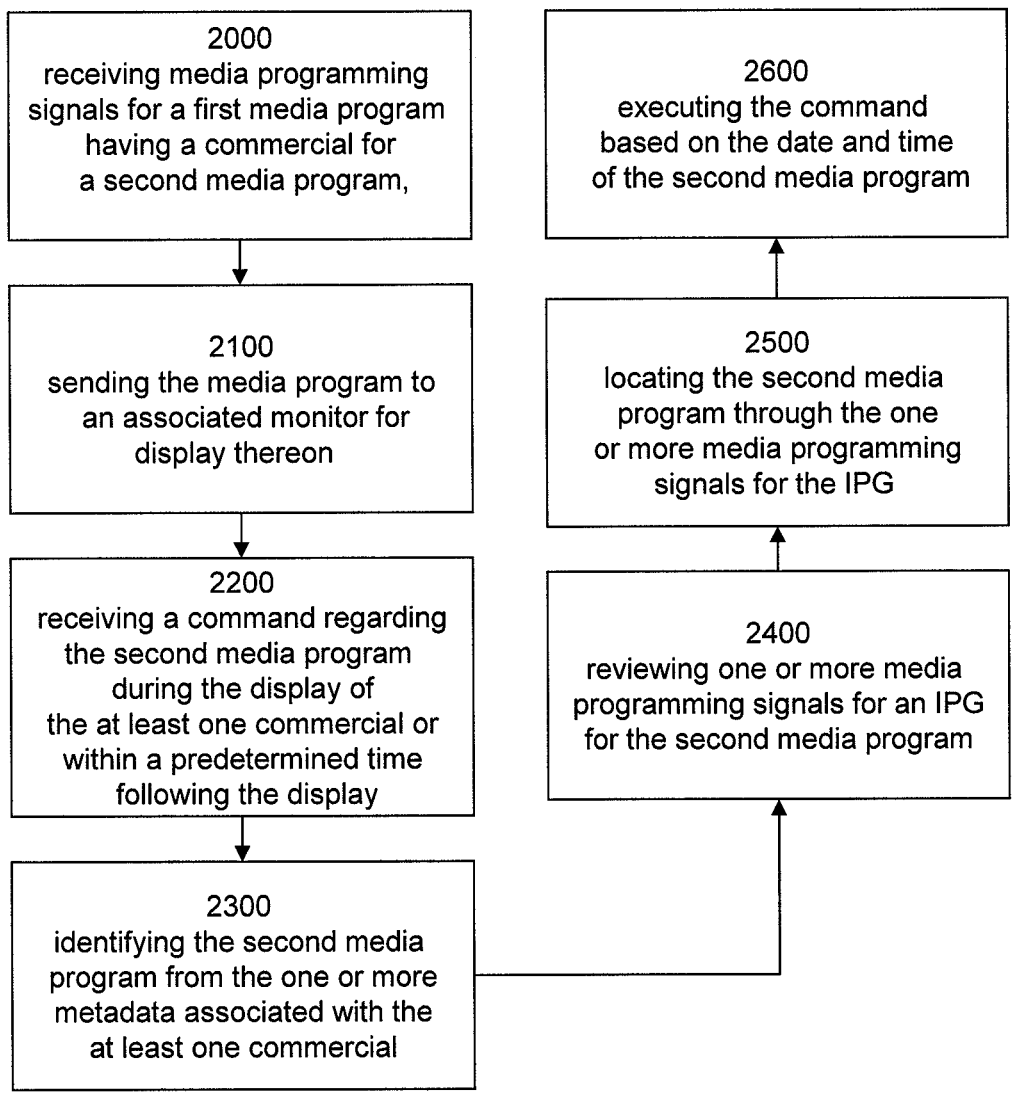
FIG. 4 is a flow chart illustration of a method according to another exemplary embodiment.

FIG. 4 illustrates another method consistent with an exemplary embodiment. The method may include receiving one or more media programming signals for a first media program having at least one commercial for a second media program, wherein the one or more programming signals includes one or more metadata associated with the at least one commercial 2000 and sending the one or more media programming signals for the first media program to an associated monitor for display thereon 2100. The method may further include receiving a command regarding the second media program during the display of the at least one commercial or within a predetermined time following the display 2200; identifying the second media program from the one or more metadata associated with the at least one commercial 2300; reviewing one or more media programming signals for an interactive programming guide for the second media program 2400; locating the second media program through the one more or more media programming signals for the interactive programming guide 2500 and executing the command based on the date and time of the second media program 2600.

One or more of the operations of FIG. 3 and FIG. 4 may be combined and performed through hardware, software, or combination thereof. Therefore embodiments may take the form of hardware systems and/or apparatuses, software, or combinations thereof. As an example, embodiments may include a computer program product stored on a computer-readable storage medium (i.e., software) comprising of one or more executable portions for performing the operations described herein. As another example, one or more apparatuses and/or systems may perform one or more of the operations. In one embodiment, the processor of the set top box may be configured to perform one or more of the operations depicted in FIG. 3 and/or FIG. 4.

Figure 5:
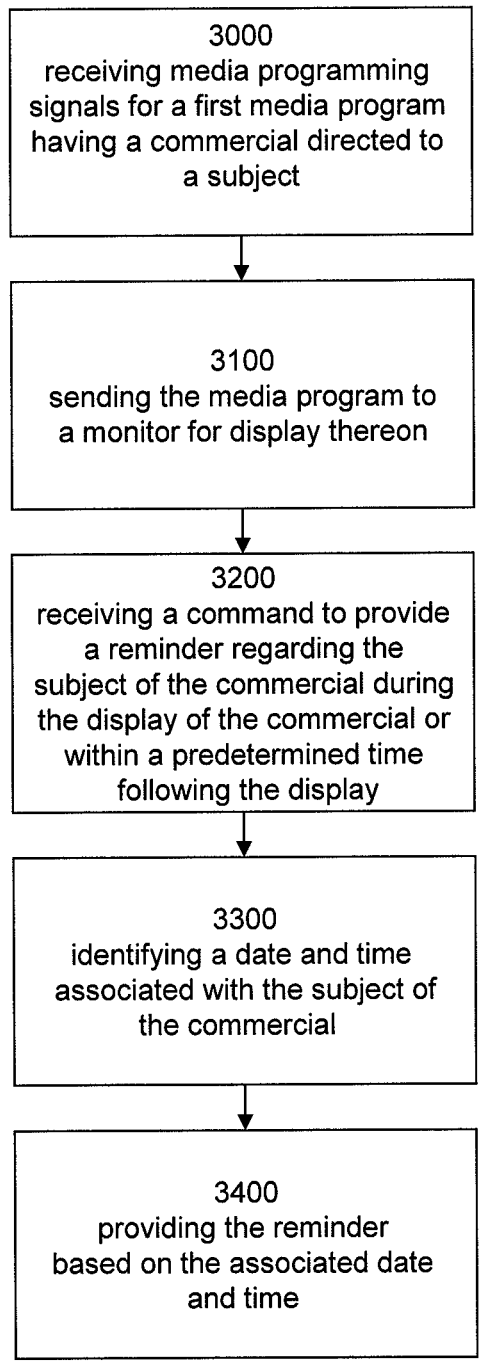
FIG. 5 is a flow chart illustration of a method according to yet another exemplary embodiment.

FIG. 5 illustrates yet another embodiment. A commercial may pertain to various subjects and include metadata regarding those subjects. As described above, the commercial may relate to a second media program. Other subjects may include an available service or product. As examples, the commercial may pertain to the first day a new product is available for sale or the first day a movie is available at the local movie theaters or available on DVD or as a VOD asset. The method of FIG. 5 relates to providing a reminder to the user regarding the subject of the commercial. The method may include receiving media programming signals for a first media program having a commercial directed to a subject 3000; sending the media program to a monitor for display thereon 3100; receiving a command to provide a reminder regarding the subject of the commercial during the display of the commercial or within a predetermined time following the display 3200; identifying a date and time associated with the subject of the commercial 3300; and providing the reminder based on the associated date and time 3400. The associated date and time of the subject may be a release or availability date.

The processor of the set top box may be configured to store commands received from the user and other sources, including any commands receiving during commercials. The processor may be further configured to provide information about the stored commands through the IPG such that the user may be able to view and/or edit the stored commands through the IPG.

It is understood that the set top box may be a stand alone device or be integrated within the television. Moreover, a television may be any monitor capable of displaying the media content from the set top box. For example, a television may be a LCD display or monitor.

The processor of a set top box or other computing device disclosed herein may be embodied in many ways. For example, a processor may be embodied as a coprocessor, a controller or various other processing means or devices including integrated circuits such as, for example, an application specific integrated circuit ("ASIC"). The memory elements described herein may be various memory structures including volatile and non-volatile memory structures. Any of the memory elements may be configured to store information, data, applications, instructions or the like for enabling the devices disclosed herein to carry out various functions in accordance with exemplary embodiments, such as by storing software that is executable by the processor to cause the various functions of the processor that are described herein to be performed. For example, a memory element could be configured to buffer input data for processing by a respective processor.

In the preceding specification, various embodiments of the claimed invention have been described. It will, however, be evident that various modifications and changes may be made thereunto without departing from the broader spirit and scope of the invention as set forth in the claims that follow. The specification and drawings are accordingly to be regarded in an illustrative rather than restrictive sense.

That which is claimed:

1. An apparatus comprising:
 a processor configured to:
  send one or more media programming signals for a first media program having at least one commercial for a second media program to an associated monitor for display thereon;
  receive a command regarding the second media program during the display of the at least one commercial or within a predetermined period following the display of the commercial, the commercial being displayed on the associated monitor and the command being received without displaying an interactive program guide interface on the associated monitor;
  identify a date and time of the second media program; and
  execute the command based on the date and time of the second media program.

2. The apparatus according to claim 1, wherein the command is to record the second media program.

3. The apparatus according to claim 1, wherein the command is to send a reminder regarding the second media program to the associated monitor for display thereon.

4. The apparatus according to claim 1, wherein the processor is further configured to identify the date and time from one or more metadata associated with the at least one commercial and to review one or more media programming signals for an interactive programming guide for the date and time of the second media program.

5. The apparatus according to claim 1, wherein the processor is further configured to receive the one or more media programming signals for the first media program having at least one commercial for a second media program, wherein the one or more media programming signals includes one or more metadata associated with the at least one commercial.

6. The apparatus according to claim 5, wherein the processor is further configured to identify the date and time from the one or more metadata associated with the at least one commercial and to verify the date and time by reviewing one or more media programming signals for an interactive programming guide for the second media program.

7. A method comprising:
 sending one or more media programming signals for a first media program having at least one commercial for a second media program to an associated monitor for display thereon;
 receiving a command regarding the second media program during the display of the at least one commercial or within a predetermined period following the display of the commercial, the commercial being displayed on the associated monitor and the command being received without displaying an interactive program guide interface on the associated monitor;
 identifying a date and time of the second media program; and
 executing the command based on the date and time of the second media program.

8. The method according to claim 7, wherein the receiving the command is for recording the second media program.

9. The method according to claim 7, wherein the receiving the command is for sending a reminder regarding the second media program to the associated monitor for display thereon.

10. The method according to claim 7, wherein identifying the date and time is from one or more metadata associated with the at least one commercial and includes reviewing one or more media programming signals for an interactive programming guide for the date and time of the second media program.

11. The method according to claim 7 further comprising receiving the one or more media programming signals for the first media program having at least one commercial for a second media program, wherein the one or more media programming signals includes one or more metadata associated with the at least one commercial.

12. The method according to claim 11, wherein the identifying the date and time is from the one or more metadata associated with the at least one commercial and further comprising verifying the date and time by reviewing one or more media programming signals for an interactive programming guide for the second media program.

13. A computer program product comprising a non-transitory computer-readable storage medium having computer-readable program code portions stored therein, the computer-readable program code portions comprising:
- a first executable portion for sending one or more media programming signals for a first media program having at least one commercial for a second media program to an associated monitor for display thereon;
- a second executable portion for receiving a command regarding the second media program during the display of the at least one commercial or within a predetermined period following the display of the commercial, the commercial being displayed on the associated monitor and the command being received without displaying an interactive program guide interface on the associated monitor;
- a third executable portion for identifying a date and time of the second media program; and
- a fourth executable portion for executing the command based on to the date and time of the second media program.

14. The computer program product according to claim 13, wherein the second executable portion is for receiving the command that is for recording the second media program.

15. The computer program product according to claim 13, wherein the second executable portion is for receiving the command that is for sending a reminder regarding the second media program to the associated monitor for display thereon.

16. The computer program product according to claim 13, wherein the third executable portion for identifying the date and time is also configured to identify the date and time from one or more metadata associated with the at least one commercial and to review one or more media programming signals for an interactive programming guide for the date and time of the second media program.

17. The computer program product according to claim 13 further comprising a fifth executable for receiving the one or more media programming signals for the first media program having the at least one commercial for the second media program, wherein the one or more media programming signals includes one or more metadata associated with the at least one commercial.

18. The computer program product according to claim 13, wherein the third executable portion for identifying the date and time is also configured to identify the date and time from one or more metadata associated with the at least one commercial, and further comprising a fifth executable portion for verifying the date and time by reviewing one or more media programming signals for an interactive programming guide for the second media program.

19. A method comprising:
- receiving media programming signals for a first media program having a commercial for a second media program;
- sending the media program to a monitor for display thereon;
- receiving a command to provide a reminder regarding the second media program during the display of the commercial or within a predetermined time following the display of the commercial, the commercial being displayed on the associated monitor and the command being received without displaying an interactive program guide interface on the associated monitor;
- identifying a date and time associated with the second media program; and
- providing the reminder based on the associated date and time.

* * * * *